Oct. 14, 1958 W. C. SMITH ET AL 2,855,765
ABSORPTION REFRIGERATION APPARATUS
Filed Aug. 24, 1956 2 Sheets-Sheet 1

WILBUR C. SMITH
HAROLD F. MASON
INVENTORS

BY Daniel H. Bobis
atty

WILBUR C. SMITH
HAROLD F. MASON
INVENTORS

United States Patent Office 2,855,765
Patented Oct. 14, 1958

2,855,765

ABSORPTION REFRIGERATION APPARATUS

Wilbur C. Smith, Rutherford, N. J., and Harold F. Mason, Richmond Hill, N. Y., assignors to Worthington Corporation, Harrison, N. J., a corporation of Delaware Application August 24, 1956, Serial No. 606,108

1 Claim. (Cl. 62—485)

This invention relates to an absorption refrigerating system using a pure component as a refrigerant and a solution of this component with a salt or liquid of another component as the absorbent and wherein the refrigerant is used as a brine or cooling medium external to the actual absorption cycle.

In absorption refrigerating systems of this general type water is boiled off a salt solution (such as a lithium bromide and water solution) in a generator to which heat is applied in any suitable manner and water vapor rises from the generator to a condenser where it is cooled by cool water circulating through the tubes of the condenser. The condensate (water) passes to an evaporator wherein pressure reduction causes a portion of the condensate to flash into water vapor resulting in a cooling of the remaining water in the evaporator. This cooled water is pumped through a heat transfer device such as an air cooling coil or to any desired refrigeration load where it absorbs heat from the medium being cooled which causes another portion of the water to evaporate. The total vapor passes to an absorber where it is absorbed by a liquid solution of water and a salt (such as a water solution which is strong in lithium bromide).

Cooling water is passed through the tubes of the absorber and removes the heat resulting from the absorption process. The salt solution passes through a heat exchanger to the generator where water vapor is again driven off. The strong salt solution from the generator passes countercurrently through the heat exchanger to the absorber.

The amount of refrigerant flashed into vapor which passes to the absorber is replenished by liquid (condensate) flow from the condenser. This flow must be regulated so as to maintain a pressure seal or differential between the condenser and evaporator. Since this liquid flow is quite small, smooth regulation is virtually impossible without resorting to capillaries or very small openings which are subject to blockage by quite small foreign deposits.

The present invention comprises an absorption refrigerating apparatus and system which will eliminate the problems of the liquid flow from condenser to evaporator and which will provide self regulation of such flow.

More specifically the present invention comprises an absorption refrigerating apparatus including a condenser and evaporator in a single shell with the refrigerant solution returned from the air or cooling coil returned directly to the condenser portion of the unit. Since this flow is large, compared with the rate of condensation, the problems involved in controlling the flow between the condenser and evaporator are materially reduced. The wall separating the condenser from the evaporator in the shell is provided with one or more orifices to permit such flow, and the orifices tend to be self regulating. Should the flow through the orifice or orifices exceed the supply of refrigerant to the condenser, the refrigerant level in the condenser will decrease, resulting in decreased liquid head and thus reduced flow. Should the level decrease to a point where the orifice or orifices are not running full, some refrigerant vapor will flow to the evaporator without being condensed. Considering weight rates of flow, the orifice capacity with vapor is very small with respect to its liquid flow capacity. A small percentage of vapor flowing through a liquid flow orifice results in a large reduction in total flow through the orifice. Thus the present invention utilizes this known fact to advantage for "self-regulation."

With these and other objects in view, as may appear from the accompanying specification, the invention consists of various features of construction and combination of parts, which will be first described in connection with the accompanying drawings, showing an absorption refrigerating apparatus of a preferred form embodying the invention and the features forming the invention will be specifically pointed out in the claim.

In the drawings.

Figures 2, 3:
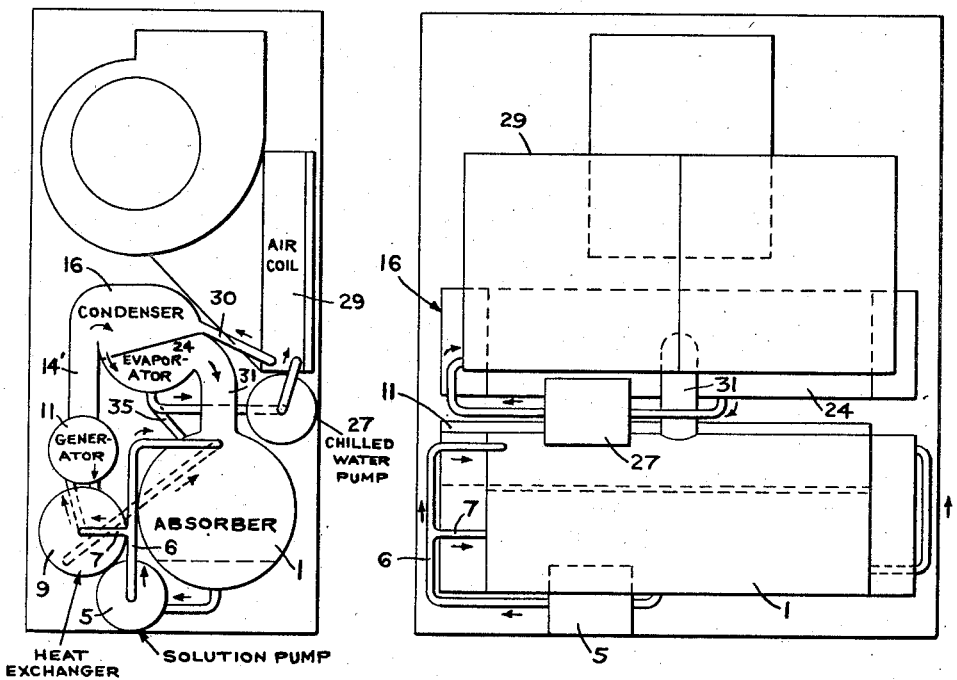
Figure 2 is an end elevation of the apparatus.
Figure 3 is a side view of the apparatus.
Figure 1:
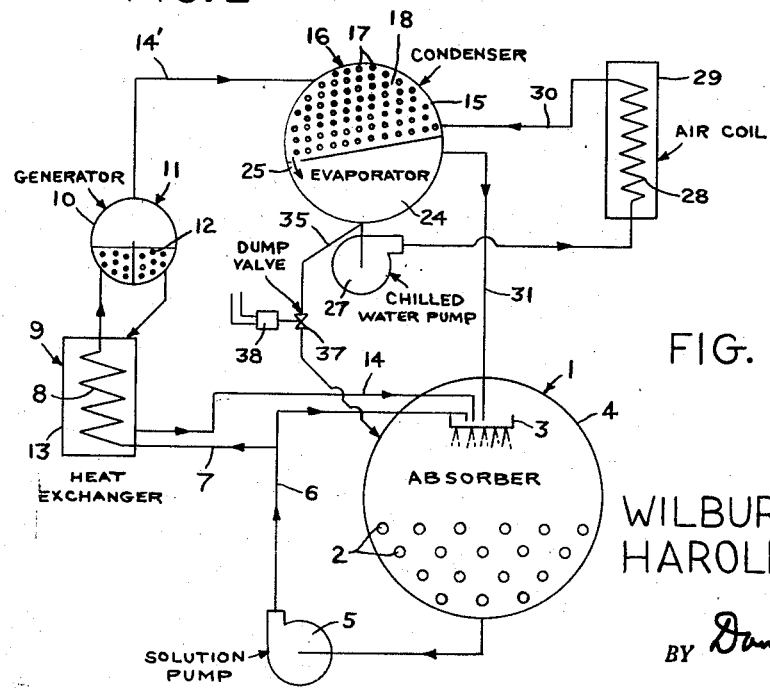
Figure 1 is a diagrammatic view showing the layout of the present absorption refrigerating system.
Figure 4:
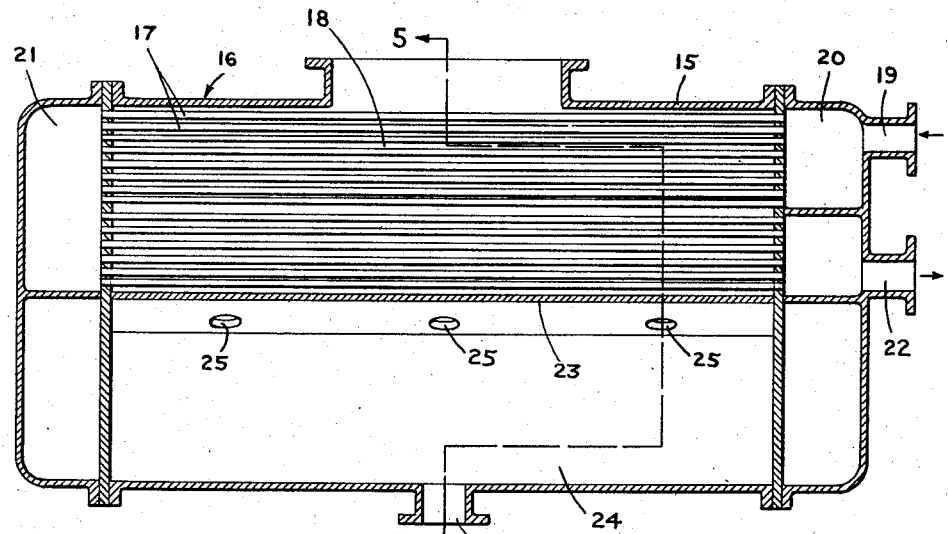
Figure 4 is a longitudinal section through the condenser-evaporator unit.

The absorption refrigerating apparatus of the present invention includes an absorber 1 which is a shell and tube heat exchange vessel, and cooling water is circulated through the tubes 2 thereof from any suitable source (not shown). The salt-water solution (which may be a lithium bromide-water solution) is sprayed or distributed into the top of the shell by any suitable type of spray nozzle or distributing device shown generically at 3 and drips downwardly over the tubes 2 to the bottom of the shell 4 of the absorber. Recirculation of the solution through the absorber is provided by a solution pump 5 and conduit 6.

A branch pipe or conduit 7 conveys part of the solution from the conduit 6 into and through the coil 8 of a heat exchanger 9.

After passing through the coil 8 of the heat exchanger 9 the liquid solution passes into and through the shell 10 of a generator 11. Heat is applied to the solution in the generator in any suitable manner, such as by the passage of steam through the tubes 12 which are located in the shell 10. Water is vaporized from the solution in the generator 11 and the unvaporized solution which is strong in its salt content and is relatively warm, is returned through the shell 13 of the heat exchanger 9, about the coil 8, and a suitable conduit 14 to the spray or distributing device 3 in the absorber.

In the heat exchanger 9 the relatively weak (in salt content) solution passing through the coil 8 is heated by the strong (in salt content) hot solution passing from the generator to the absorber through the shell of the exchanger 9. This directly reduces heating requirements in the generator 11 and cooling water requirements in the absorber 1.

From the generator 11 the vapor passes through a suitable conduit 14 into the top of the shell 15 of the combined condenser and evaporator unit 16 where it is condensed by cooling water circulated through the tubes 17 of the condenser section 18.

While in the drawings the cooling water is shown as passing in a double pass through the tubes 17 (i. e. entering through the inlet 19 into a divided water box 20 and passing through part of the tubes 17 into the return water box 21, and from the water box 21 back through other of the tubes 17 to the outlet 22) it is to be understood that a single pass for the cooling water may be provided if desired.

A wall or partition 23 extends across the interior of the shell 15 for its entire length and divides the interior of the shell into the upper condenser section and the lower evaporator section 24. The lower section evaporator section 24 forms a flash evaporator.

Figure 5:
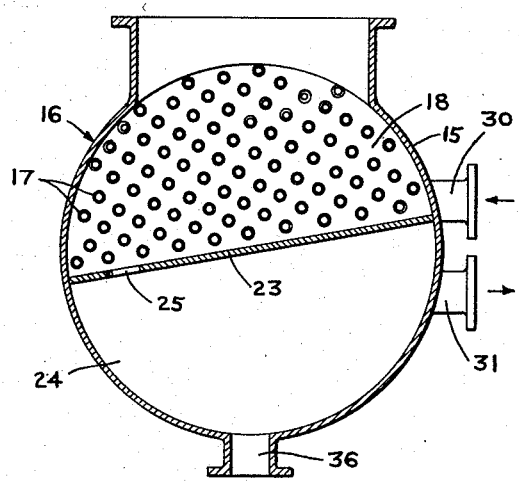
Figure 5 is a cross section through the condenser-evaporator unit taken on the line 5—5 of Figure 4.

The partition 23 inclines transversely of the shell as clearly shown in Figure 5 of the drawings and it has one or more orifices 25 therein near its lowermost edge to permit liquid flow from the condenser section 18 into the evaporator section 24. The size and number of these orifices 25 is regulated in accordance with the flow conditions required in the system.

Evaporation of liquid in the evaporator section 24 chills the liquid remaining in the evaporator and this chilled liquid is pumped by a chilled water pump 27 through the coil 28 of an air coil 29, or any other suitable refrigerating apparatus.

The chilled water is returned through a suitable conduit 30, to the condenser section 18, just above the high edge of the partition 23 (as clearly shown in Figure 5) from whence it flows over the partition 23 and through orifice or orifices 25 into the evaporator section 24.

Vapor from the evaporator section passes through a suitable conduit 31 to the absorber 1.

The flow of the chilled water from the coil 28 into the condenser 18 is large, compared with the rate of condensation and thus the problems normally involved (in other types of similar absorption refrigerating systems) in controlling the flow between the condenser 18 and evaporator 24 are materially reduced. The orifices 25 tend to be self regulating, for should the flow through them exceed the supply of refrigerant to the condenser, the liquid level in the condenser will decrease, resulting in decreased liquid head and thus reduced flow through the orifices. Should the liquid level in the condenser 18 decrease to a point where the orifice or orifices 25 are not running full, some refrigerant vapor will flow through the orifices 25 to the evaporator without being condensed. Considering weight rates of flow, the capacity of the orifices 25, with vapor, is very small with respect to their liquid flow capacity, and a small percentage of vapor flowing through the liquid flow orifices results in a large reduction in total flow. Thus the present unit comprised of the condenser section 18 and evaporator section 24, with the flow orifice or orifices 25 provides for self regulation for the no-load to full-load modulation of the apparatus.

For the purpose of decreasing the salt concentration in the absorber 1 during shut down of the apparatus, a conduit 35 connects the chilled water outlet 36 of the evaporator 24 with the absorber 1 to dump water stored in the evaporator 24 into the absorber. A dump valve 37 is located in the conduit 35 and may be manually operated or operated by a solenoid (indicated at 38). The solenoid 38 may be connected in the electrical circuit (not shown) of the apparatus, to operate automatically with the stop and start controls (not shown) of the apparatus.

It will be understood that the invention is not to be limited to the specific construction or arrangement of parts shown, but that they may be modified within the invention defined by the claim.

What is claimed is:

In an absorption refrigeration system including the combination of a shell and an inclining partition in said shell dividing it into an upper condenser section and a lower evaporator section, at least one orifice in the lowermost edge of said partition through which liquid refrigerant is adapted to flow from the condenser section into the evaporator section at a rate depending on the head of said liquid refrigerant above the inclining partition in the condenser section, an air coil forming cooling equipment, and means for circulating liquid refrigerant from said evaporator section through said cooling equipment and into said condenser section to thereby produce a head in said liquid refrigerant above said partition for controlling the liquid flow through said partition orifice in accordance with load requirements.

References Cited in the file of this patent

UNITED STATES PATENTS

| | | |
|---|---|---|
| 1,455,701 | Altenkirch | May 15, 1923 |
| 2,099,201 | Getaz | Nov. 16, 1937 |
| 2,518,202 | Thomas | Aug. 8, 1950 |
| 2,563,575 | Berry | Aug. 7, 1951 |
| 2,610,481 | Whitlow | Sept. 16, 1952 |